(12) United States Patent
Bocking et al.

(10) Patent No.: US 7,966,323 B2
(45) Date of Patent: Jun. 21, 2011

(54) ENABLING CATEGORY-BASED FILTERING

(75) Inventors: Andrew D. Bocking, Waterloo (CA);
Ronald Scotte Zinn, Waterloo (CA);
Michael Thomas Hardy, Waterloo (CA)

(73) Assignee: Research In Motion Limited, Waterloo (CA)

( * ) Notice: Subject to any disclaimer, the term of this patent is extended or adjusted under 35 U.S.C. 154(b) by 576 days.

(21) Appl. No.: 11/221,691

(22) Filed: Sep. 9, 2005

(65) Prior Publication Data
US 2006/0059185 A1 Mar. 16, 2006

Related U.S. Application Data

(60) Provisional application No. 60/608,868, filed on Sep. 13, 2004.

(51) Int. Cl.
*G06F 17/30* (2006.01)
*G06F 7/00* (2006.01)
(52) U.S. Cl. ........................... 707/731; 707/771
(58) Field of Classification Search .............. 707/3, 101, 707/102, 731, 771; 706/11; 725/53
See application file for complete search history.

(56) References Cited

U.S. PATENT DOCUMENTS

| 5,457,738 | A | 10/1995 | Sylvan | |
|---|---|---|---|---|
| 6,557,004 | B1* | 4/2003 | Ben-Shachar et al. | 707/102 |
| 6,604,090 | B1* | 8/2003 | Tackett et al. | 706/11 |
| 6,879,996 | B1 | 4/2005 | Laves | |
| 7,363,309 | B1* | 4/2008 | Waite et al. | 707/101 |
| 2002/0143780 | A1 | 10/2002 | Gorman | |
| 2003/0069874 | A1 | 4/2003 | Hertzog et al. | |
| 2003/0227487 | A1 | 12/2003 | Hugh | |
| 2004/0194141 | A1* | 9/2004 | Sanders | 725/53 |
| 2005/0144162 | A1* | 6/2005 | Liang | 707/3 |

FOREIGN PATENT DOCUMENTS

EP 0797163 A 9/1997

(Continued)

OTHER PUBLICATIONS

Whittaker, S. et al., "Managing Long Term Communications: Conversation and Contact Management", Proceedings of the 35th Annual Hawaii INternational Conference on System Sciences, 2002, pp. 1070-10979, INSPEC Accession No. 7198084.

(Continued)

*Primary Examiner* — Usmaan Saeed
*Assistant Examiner* — Navneet K Ahluwalia

(57) ABSTRACT

A category may be associated, in a personal information manager (PIM) application, with a data item by associating a category pattern with the data item. Where the PIM application already associates keyword patterns with data items for enabling keyword searching, the category pattern may have a format of an ordered plurality of elements that satisfies at least one rule for the format of the keyword patterns. Optionally, the first element of the ordered plurality of elements may be an element predetermined to be specific to pluralities of elements associated with categories. Advantageously, this approach to the association of a category with a data item allows for the association of more than one category with a single data item. Such an allowance provides for more accurate synchronization with a PIM application on a desktop that also allows the association of more than one category with a data item. Given the allowance of the association of multiple categories with a single data item, the user may filter a list of data items by one or more categories.

16 Claims, 11 Drawing Sheets

FOREIGN PATENT DOCUMENTS

| WO | WO 9429808 A | 12/1994 |
| WO | WO 2005/060221 | 6/2005 |
| WO | WO 2005 060221 A1 | 6/2005 |

OTHER PUBLICATIONS

Chapura Inc. "Keysuite: Convenient Companion to Outlook", retrieved Jan. 20, 2005 from HTTP://www.chapura.com/keysuite_details.php.

Web Information Solutions Inc. "Pocket Informant 2005—desktop Outlook-like power on your pocket PC" retrieved Nov. 8, 2005 from http://www.pocketinformant.com/products_info.php?p_id=pi&dir=wm&tab_id=introduction.

Microsoft Corporation "Outlook 2002 add-in: Pocket Contact Synchronizer 1.2" retrieved Nov. 8, 2005 from http://www.microsoft.com/downloads/details.aspx?FamilyID=2d31c7f0-b871-49ce-9f96-712a1695e372&DisplayLang=en.

Mikhailov, Serge "pim—personal information manager" retrieved Nov. 8, 2005 from http://www.ababasoft.com/ti/index.html.

Intellisync Mobility Unlimited "Intellisync Handheld Edition for Enterprise" Product Brochure retrieved from http://portland.iu.nl/Brochures/Intellisync/ISHE4Ent_DS.pdf.

Developerone Inc. "Power Tasks for Windows mobile powered smartphones" retrieved Nov. 8, 2005 from http://www.developerone.com/powertasks/index.htm.

Web Information Solutions Inc. "Pocket Informant: Innovation in Personal and Business Information Management" Aug. 2004 Reference Guide for Windows Mobile.

Whittaker, S. et al. "Managing long term communications: conversation and contact management" Proceedings of the 35th Annual Hawaii International Conference on System Sciences-2002, Jan. 7-10, 2002.

* cited by examiner

ENABLING CATEGORY-BASED FILTERING

CROSS REFERENCE TO RELATED APPLICATIONS

The present application claims the benefit of prior provisional application Ser. No. 60/608,868, filed Sep. 13, 2004, which is hereby incorporated herein by reference in its entirety.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

The present patent application relates to personal information manager applications and, more particularly, to a user interface in such applications that provides for forming an association between data items and categories, thereby enabling category-based filtering.

BACKGROUND

Personal information manager (PIM) applications are increasingly common as lives become more complex and require organization. Such applications are typically executed on a processor of a personal computer, regardless of desktop or laptop configuration. However, as the information data items, such as e-mail messages, calendar events, voice mail messages, contacts in an address book, memos or notes, appointments and task items, recorded in a PIM application can be useful outside of the office or home environment, a market has developed for portable, handheld devices that execute a PIM application to make the data items available, even when away from the main personal computer. Exemplary such devices are known as PocketPC™ devices and Palm™ devices, depending on the operating system executed on the device. Such devices may also include devices referred to as "Smart Phones". Again, dependent upon the operating system executed on the device, the device may be known as a PocketPC™ device or a Palm™ device. Such a device may also run an alternative operating system such as a Symbian operating system or a Blackberry operating system. Often a program is executed on the personal computer that allows a user to synchronize the data items maintained by a PIM application executed on the personal computer with the data items maintained by a PIM application executed on a portable, handheld computer. Alternatively, rather than maintaining the data items in a PIM application executed on a personal computer, the personal computer may execute a client PIM application to create, view and edit data items provided by an enterprise server.

PIM applications often allow the association of a category with each data item maintained by the PIM application to assist in organization and searching. For example, a user may associate each contact in the address book with either a "Business" category or a "Personal" category. Given the comparatively greater computing power available from a modern personal computer compared to a modern portable, handheld computer, many additional features are typically found on a PIM application executed on a personal computer than a PIM application executed on a portable, handheld computer. Currently, Outlook™ 2002 by marketed by Microsoft™ of Redmond, Wash., supports the association of more than one category with a data item (such as a contact). For instance, a particular contact may be associated with a "Personal" category as well as a "University Friends" category. Unfortunately, many known PIM applications for execution on handheld computers only allow for the association of a single category with a data item, if at all. Among those known PIM applications that associate a single category with a data item, the number of available categories is often limited, as is the number of characters per category name. For example, in the current Palm™ operating system, marketed by PalmSource, Inc. of Sunnyvale, Calif., the user is restricted to defining a total of 15 categories and limited to 15 characters per category name.

Clearly, it would be of use to allow for data items in a PIM application executed on a handheld computer to be associated with more than one category and that the association lend itself to efficient category-based filtering.

DETAILED DESCRIPTION

Figure 1:
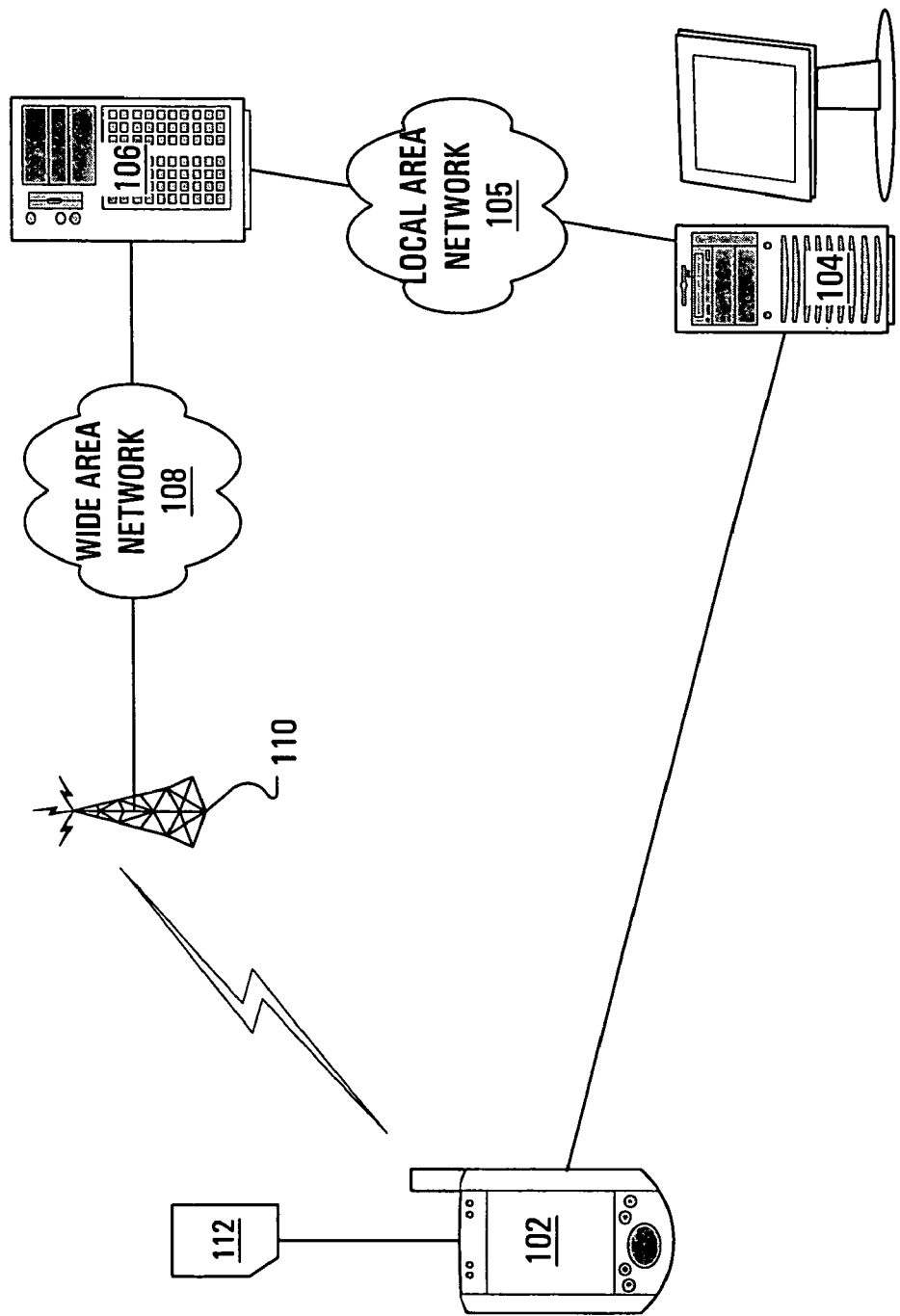
FIG. 1 illustrates a typical operating environment for a handheld computer.

Where a PIM application associates patterns of a first type (a keyword type) with data items for purposes of a keyword-based filtering scheme, category-based filtering of the data items may be enabled by associating a distinct pattern of a second type (a category type) with each category among several categories, where a rule satisfied by the keyword patterns is also satisfied by the category patterns so that the same filtering scheme may be used. Optionally, a first element of the category pattern may be an element predetermined to be specific to category patterns. Based on the association of a category pattern with a data item, a user interface (UI) for a PIM application for a handheld computer may allow a user to associate more than one category with a data item. Given the allowance of the association of multiple categories with a single data item, the user may filter a list of data items by one or more categories. Advantageously, the aspects of this application allow for over eight million categories.

In accordance with an aspect of the present application there is provided a method of enabling category-based filtering of a plurality of data items. The method includes, in an application that associates patterns of a first type with the plurality of data items, where the patterns of the first type satisfy a rule, associating a pattern of a second type with a category, where the pattern of the second type satisfies the rule. In further aspects of the present application, a handheld computer is provided for carrying out this method and a computer readable medium is provided for adapting a processor in a handheld computer to carry out this method.

In accordance with another aspect of the present application there is provided a method for facilitating retrieval of electronic address book entries. The method includes associating at least one keyword pattern with each address book entry of a plurality of address book entries, each keyword pattern having a first format and, where a category for a given address book entry is selected, associating a category pattern representative of the category with the given address book entry, the category pattern having the first format, the category pattern being associated with the given address book entry such that a search on a given pattern traverses the category pattern and each keyword pattern associated with the given address book entry.

In accordance with a further aspect of the present application there is provided a method of adding a category to a master list of categories. The method includes receiving an indication of a category name, formulating an ordered plurality of elements, associating the ordered plurality of elements with the category name and adding a reference to the category name to the master list of categories. In further aspects of the present application, a handheld computer is provided for carrying out this method and a computer readable medium is provided for adapting a processor in a handheld computer to carry out this method.

In accordance with a still further aspect of the present application there is provided a method of associating a category with a data item. The method receiving an indication of the data item, receiving an indication of the category to associate with the data item, determining an ordered plurality of elements associated with the category and associating the ordered plurality of elements with the data item. In further aspects of the present application, a handheld computer is provided for carrying out this method and a computer readable medium is provided for adapting a processor in a handheld computer to carry out this method.

In accordance with still another aspect of the present application there is provided a method of synchronizing a first data item referenced by a personal information manager application executed on a personal computer with a corresponding second data item referenced by a personal information manager application executed on a handheld computer. The method includes receiving, at the handheld computer, an indication of a category associated, in the personal information manager application executed on the personal computer, with the first data item, formulating an ordered plurality of elements and associating, in the personal information manager application executed on the handheld computer, the ordered plurality of elements with the second data item.

Other aspects and features will become apparent to those of ordinary skill in the art upon review of the following description of specific embodiments in conjunction with the accompanying figures.

FIG. 1 illustrates a typical operating environment for a handheld computer 102. In particular, the handheld computer 102 is shown as associated with a personal computer 104. The data items maintained by a PIM application executed on the handheld computer 102 may occasionally be synchronized with a PIM application executed on the personal computer 104.

As is known, the synchronization between the personal computer 104 and the handheld computer 102 may be accomplished via a wireline connection such as a direct serial connection or a Universal Serial Bus (USB) connection. Furthermore, the synchronization between the personal computer and the handheld computer may be accomplished via a wireless connection such as an infrared connection, a Bluetooth™ connection or a wireless local area network (WiFi, IEEE 802.11) connection.

The personal computer 104 may communicate, through a local area network (LAN) 105, with an enterprise server 106 such that the PIM application executed on the personal computer 104 may act as a client to the enterprise server 106. Such enterprise servers are known to include Microsoft Exchange servers and IBM Lotus Notes servers. Notably, synchronization between the data items accessed by the PIM application on the personal computer 104 and data items maintained by the PIM application executed on the handheld computer 102 may occur directly between the enterprise server 106 and the handheld computer 102 using a radio frequency (RF), e.g., Mobitex™, DataTAC™, General Packet Radio Service, data connection.

Where the handheld computer 102 is a mobile communication device, the handheld computer 102 may communicate over an RF data connection with an antenna 110 that is representative of a wireless communication network. As is typical, the wireless communication network is illustrated as communicatively connected to a wide area network (WAN) 108, which may comprise the modern-day Internet and successors. Through the wireless connection to the antenna 110, the wireless communication network and the WAN 108, the data items on the handheld computer 102 may be synchronized with the data items on the enterprise server 106.

Where the synchronization between the handheld computer 102 and the enterprise server 106 occurs over an RF data connection, the addition of category information to the synchronization data may be seen to increase the amount of traffic sent over the RF data connection and, consequently, increase airtime costs for the end user. As such, a synchronization agent application on the handheld computer 102 may be configured to only transmit category information if the category information has been modified.

As will be appreciated by a person skilled in the art, to support synchronization of category data between a PIM application executed on the personal computer 104 and a PIM application executed on the handheld computer 102, field identifiers may be required to be defined on the handheld computer 102.

The handheld computer 102 may be loaded with computer readable instructions for executing exemplary methods from a software medium 112 which could be a disk, a tape, a chip, a flash memory card or a random access memory containing a file downloaded from a remote source.

The number of data items maintained by a PIM application executed on a personal computer or on a handheld computer generally grows with continued use of the PIM application. Such growth can lead to frustration when trying to find a particular contact in the address book application or a particular memo in the memo application.

To assist a user in the task of finding a data item, a filtering scheme may be implemented. In one exemplary filtering scheme, a given data item that is to be subject to filtering is processed to determine a set of keyword strings to associate with the given data item. For example, an address book entry (a data item) for "Michael Hardy" may be associated with two keyword strings "Michael" and "Hardy". Each keyword is then processed. In particular, when a given keyword is processed, a pattern, or key, may be determined based on the first three characters of the given keyword. The pattern may subsequently be used to quickly find the given data item using a pattern matching scheme.

In particular, in an exemplary scheme, each character that may be used in a keyword string (e.g., letters, numbers, accented letters, punctuation) may be mapped to a five-bit value, i.e., an integer in the range 1-31, inclusive. For example, a or A may map to 1, b or B may map to 2, . . . , y or Y may map to 25 and z or Z may map to 26.

Following this scheme, the keyword "Michael" may be processed, first to determine that the first three characters are "m", "i" and "c", then to map each of the characters to elements, i.e., five-bit values, of the pattern. For this example, m maps to 01101 (13), i maps to 01001 (9) and c maps to 00011 (3). The three five-bit values may be combined to form a single fifteen-bit value, 01101 01001 00011, which may then be converted to a decimal value, 13603. The decimal value may be stored as the pattern for the keyword "Michael". The three five-bit values may be considered to form a pattern that is a three element set or a three-tuple (01101, 01001, 00011) or (13, 9, 3).

A rule may specify that the keyword patterns are to use five-bit elements.

This filtering scheme may be used to restrict a list of data items, such as contacts in the address book application. For instance, a user interface may be presented to a user of a PIM application to allow the user to find the data item associated with a particular contact. Initially, the user interface may provide a data entry field and a complete list of the contacts (data items) maintained by the address book application. The user may type characters in the data entry field, where the characters may, for instance, relate to the first name or last name of the particular contact that the user wishes to find. As the user types characters in the data entry field, the list of contacts presented by the address book application user interface may be restricted.

For example, consider an address book application maintaining data items for three contacts, named Mark Smith, Jason Mindy and Michael Adams, respectively. If the user enters the character "m" in the data entry field of the user interface, the list of contacts will not be restricted, as all three data items have a keyword for which 01101 will be determined as the first element of a corresponding pattern. If the user adds the character "i" to the data entry field of the user interface, the list of contacts may be restricted to just Jason Mindy and Michael Adams, i.e., only the data items associated with a pattern having 01101 as the first element and 01001 as the second element. If the user adds the character "c" to the data entry field of the user interface, the list of contacts may be restricted to just Michael Adams, i.e., the only data item associated with a pattern having 01101 as the first element, 01001 as the second element and 00011 as the third element. The use of patterns in this filtering scheme may be considered to allow the restriction of the list of data items to be performed quickly.

In overview, where a PIM application associates patterns of a first type (a keyword type) with data items for purposes of a keyword-based filtering scheme, category-based filtering of the data items may be enabled by associating a distinct pattern of a second type (a category type) with each category among several categories, where a rule satisfied by the keyword patterns is also satisfied by the category patterns so that the same filtering scheme may be used.

A category identifier (ID), which is a reference integer by which a category may be referred rather than by name, may be assigned to the given category and the category ID may be used to determine the category pattern for the given category. The determined category pattern may then be associated with any data item (e.g., an address book entry) that is to be associated with the given category. Advantageously, the category pattern may be associated with the data item along with the keyword patterns that are also associated with the data item. Additionally, the category pattern may satisfied a rule that is also satisfied by the keyword patterns to allow for category-based filtering that uses the keyword filtering scheme.

Performing category-based filtering on a list of data items may be accomplished using the existing keyword filtering scheme that involves trying to match the elements of a target pattern, in order. Thus, to filter a list of data items, selected, for instance, by opening the PIM address book application, the user may simply select a category from a master list of categories to use as a filter for the list. The category pattern associated with the selected category may then be used as a target pattern. The target pattern may then be compared with all patterns (i.e., both category patterns and keyword patterns) associated with the data items. A category-filtered list may thus be generated populated by only those data items associated with a pattern that matches the target pattern.

Optionally, each category pattern may be determined to include, as a first element, a special element having an element value selected from among element values that do not map to characters available for entry in the data entry field. Notably, in the keyword filtering search, the user enters one character at a time and the search filters the data items based on a one-element target pattern, then based on a two-element target pattern and then based on a three-element target pattern. In contrast, in the category filtering search, the filtering of the data items is immediately based on a target pattern having as many elements as are present in the category pattern.

Advantageously, where data items maintained by a PIM application executed on a personal computer are associated with multiple categories, the data items may be synchronized with the data items maintained by a PIM application executed on a handheld computer, where the PIM application executed on the handheld computer employs aspects of the present application to maintain the association of multiple categories with the data items.

Where aspects of the present application are implemented in an object-oriented programming language, a new model (a set of classes) may be created to contain the categories that are associated with an individual data item. An object defined by a class in the new model may then be associated with a data item object.

Figure 2:
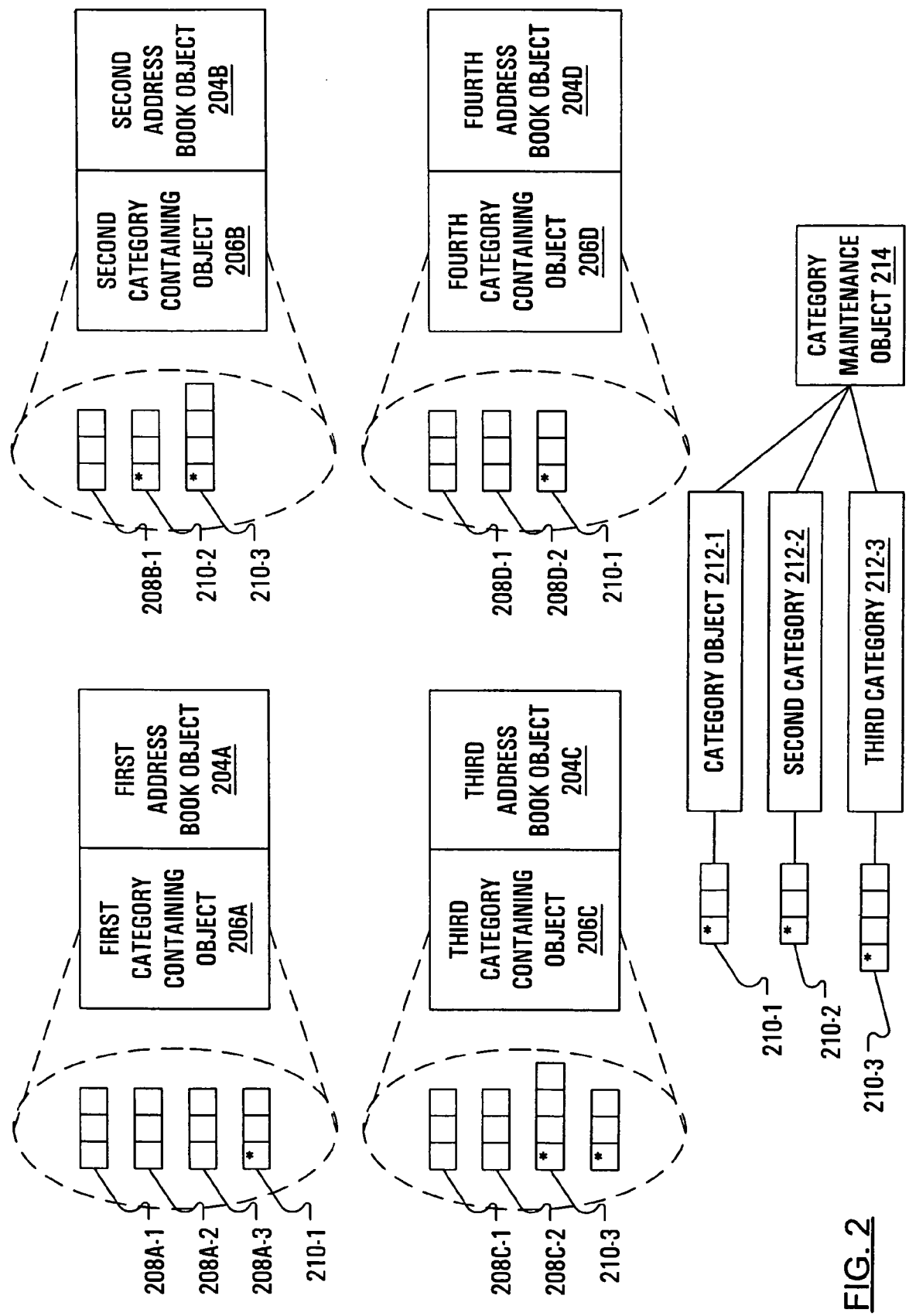
FIG. 2 illustrates an exemplary collection of four data items with associated patterns according to an embodiment of this application.

FIG. 2 illustrates an exemplary collection of objects. The collection of objects includes a category maintenance object 214, which maintains a master list of categories that includes a first category object 212-1, a second category object 212-2 and a third category object 212-3. The first category object 212-1 is associated with a first category pattern 210-1. The second category object 212-2 is associated with a second category pattern 210-2. The third category object 212-3 is associated with a third category pattern 210-3. Additionally, a first address book object 204A, a second address book object 204B, a third address book object 204C and a fourth address book object 204D (individually or collectively 204) are illustrated. The first address book object 204A is associated with a first category containing object 206A. The first category containing object 206A is illustrated as containing three keyword patterns 208A-1, 208A-2, 208A-3 (individually and collectively 208A) and the first category pattern 210-1. Notably, the first category pattern 210-1 is illustrated as having a special first element, thus, the first category pattern 210-1 is distinguished from the three keyword patterns 208A.

The second address book object 204B is associated with a second category containing object 206B. The second category containing object 206B is illustrated as containing a keyword pattern 208B-1, the second category pattern 210-2 and the third category pattern 210-3.

As will be discussed hereinafter, a category pattern may have more elements than a predetermined number (three, in this case) that matches the number of elements in the keyword patterns. Notably, the third category pattern 210-3 is illustrated in FIG. 2 as including four elements. Thus, the third category pattern 210-3 may be distinguished from the first category pattern 210-1, the second category pattern 210-2 and the keyword patterns 208.

The third address book object 204C is associated with a third category containing object 206C. The third category containing object 206C is illustrated as containing two keyword patterns 208C-1, 208C-2, the first category pattern 210-1 and the third category pattern 210-3.

The fourth address book object 204D is associated with a fourth category containing object 206D. The fourth category containing object 206D is illustrated as containing two keyword patterns 208D-1, 208D-2 and the first category pattern 210-1.

If the address book objects 204 of FIG. 2 are filtered using category-based filtering with the first category as a filter criteria, the first address book object 204A, the third address book object 204C and the third address book object 204D would be included in a resulting category-filtered list.

If the address book objects 204 of FIG. 2 are filtered using category-based filtering with the second category as a filter criteria, only the second address book object 204B would be included in a resulting category-filtered list.

If the address book objects 204 of FIG. 2 are filtered using category-based filtering with the third category as a filter criteria, the second address book object 204A and the third, address book object 204C would be included in a resulting category-filtered list.

Figure 3:
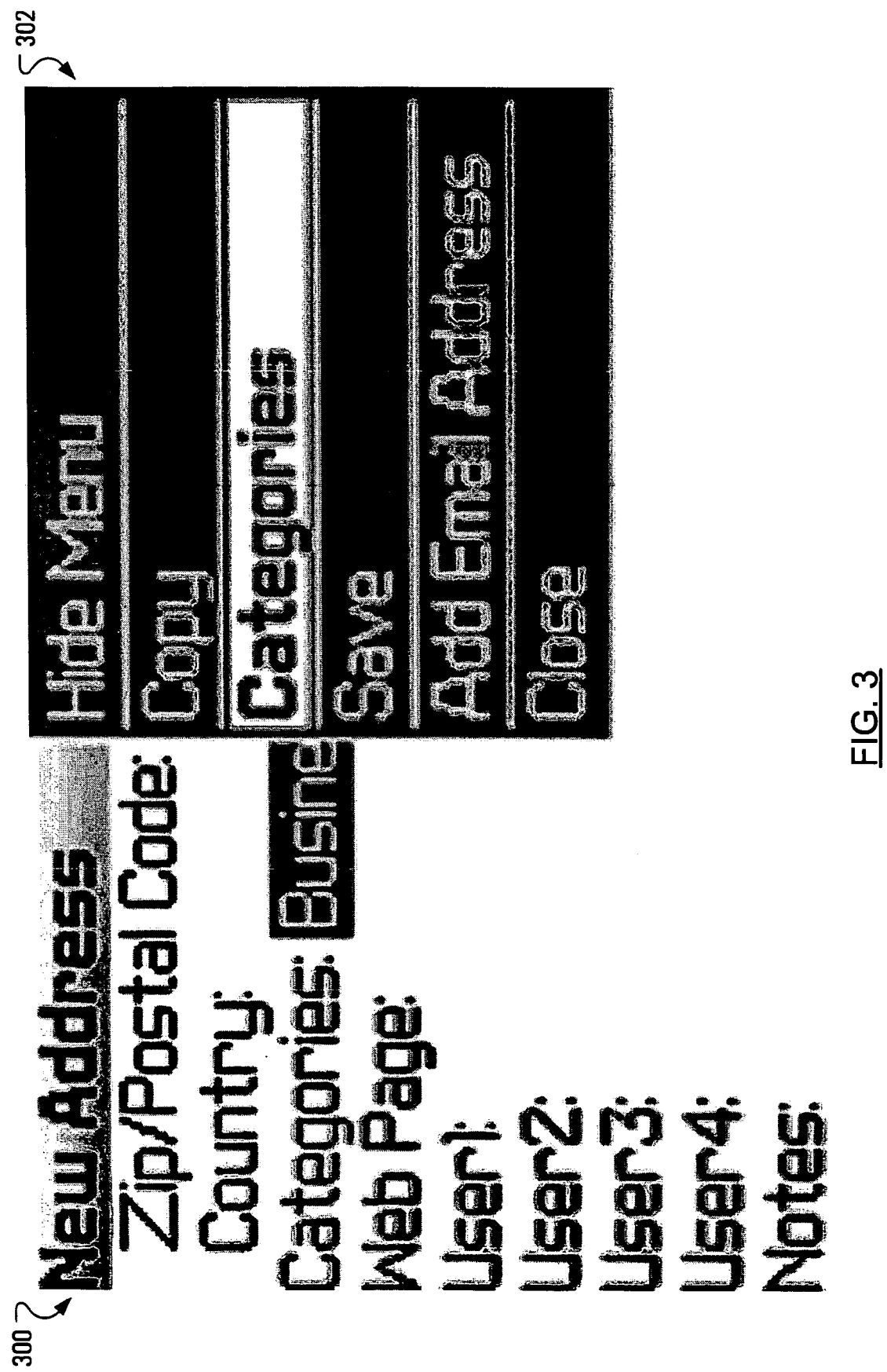
FIG. 3 illustrates the activation of a "Select Categories" UI from a contact editing screen in a PIM application.

FIG. 3 illustrates a contact editing screen 300 exemplary of a contact editing screen that may be found in a PIM application executed on the handheld computer 102. Many fields are available for populating for a data item (a contact) being edited. While presented with the contact editing screen 300, the user may trigger, e.g., by pressing a button on the handheld computer 102, the presentation of a menu. FIG. 3 illustrates the presentation of a menu 302 that includes several menu items. The menu items include: Hide Menu; Copy; Categories; Save; Add Email Address; and Close.

Figure 4:
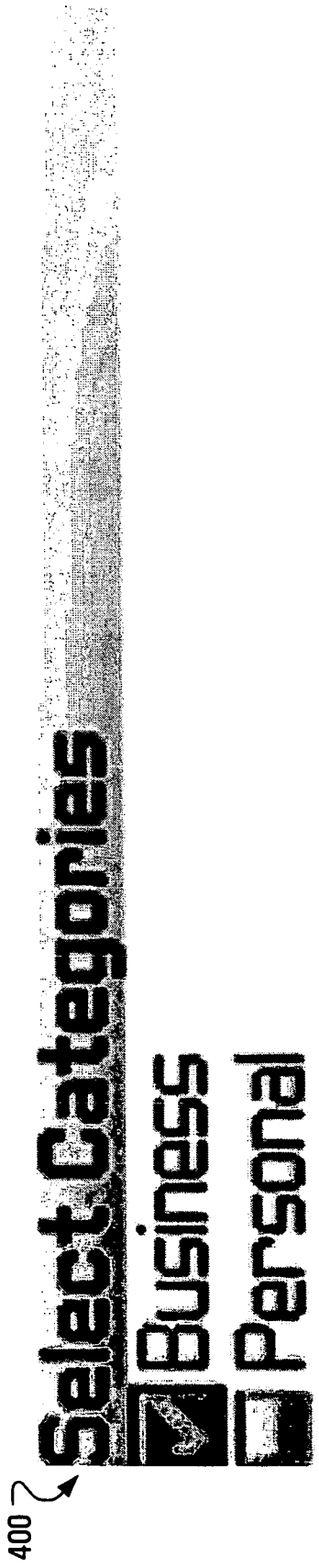
FIG. 4 illustrates the "Select Categories" UI activated in FIG. 3.

The selection of the Categories menu item may lead to the presentation of a "Select Categories" UI. In one embodiment of this application, the user pressing the "space" key when a category field of the contact editing screen 300 is highlighted may trigger the display of the Select Categories UI. FIG. 4 illustrates an exemplary Select Categories UI 400. The exemplary Select Categories UI 400 presents the master list of categories that includes a list of checkboxes with one checkbox associated with each category name in the master list of categories. If the category name will not fit completely within a single line of the display, the category name may be shown with ellipsis.

The Select Categories UI 400 may present a menu (not shown) that includes several menu items. The menu items may include: Hide Menu; Change Option; New; Delete; Clear Selection; and Close.

Selecting the Change Option menu item may toggle the status of the checkbox associated with the currently selected category between a checked state and an unchecked state.

Selecting the New menu item may display a new category dialog in which the user can enter a category name for a new category. The new category dialog may include a title and a field for entering the category name for the new category. If there are any restrictions on the text for the category (e.g., length, format, etc.) the restrictions may be enforced by the new category dialog. In the case where characters are mapped to five-bit values, case may be considered insignificant for category names. For example, the category name "Friends" may be considered the same as the category name "FRIENDS" and the category name "friends". Clearly, if more bits are used for the values to which the characters map, case may be considered significant. If a category name provided for a new category already exists in the master list of categories, then the category name may not be added to the master list of categories. The user may be informed that the category name already exists.

Selecting the Delete menu item may result in the presentation of a prompt asking the user to confirm deletion of the currently selected category. If the user confirms the deletion, the currently selected category may be removed from the master list of categories. The Delete menu item may not be available if there are no categories in the master list of categories.

Selecting the Clear Selection menu item may set all category checkboxes to the unchecked state. This menu item may only be available if one or more checkboxes are in the checked state.

Among the categories presented in the Select Categories UI 400, the user may select one or more to associate with the contact being edited. In response to such an indication that one or more categories should be associated with the contact being edited, category patterns for the one or more categories may be added to the keyword patterns already associated with the contact being edited.

Figure 5:
FIG. 5 illustrates the use of the "Select Categories" UI of FIG. 4 to add a new category.
Figure 6:
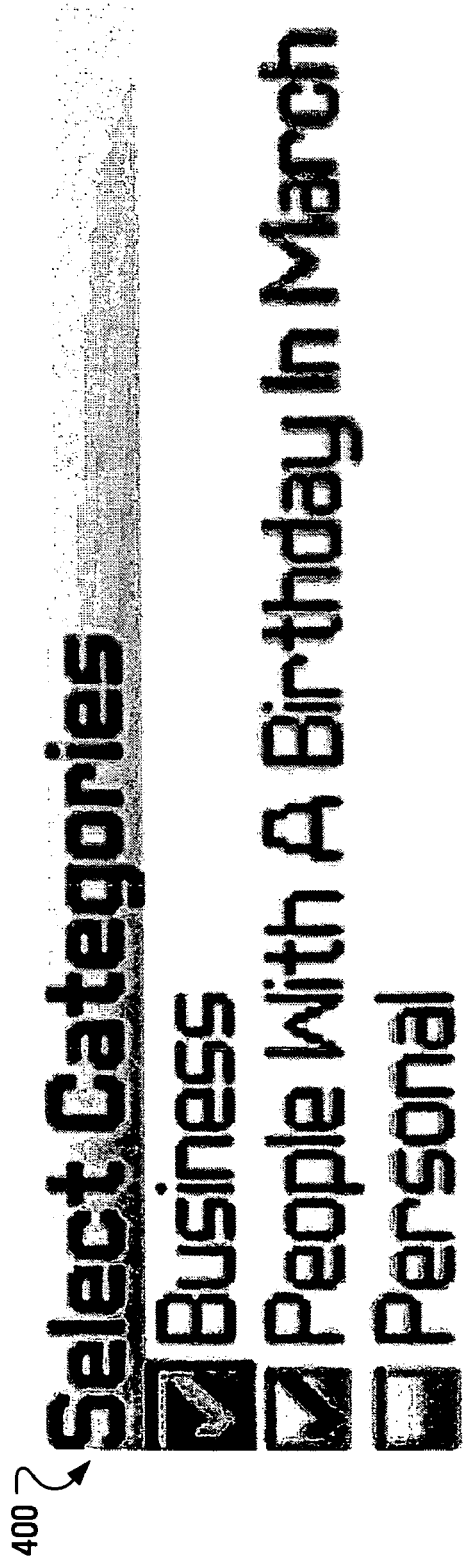
FIG. 6 illustrates the selection of more than one category in the "Select Categories" UI of FIG. 4.

Additionally, the user may select the New menu item and provide a category name for a new category. FIG. 5 illustrates a new category dialog 500 as part of the Select Categories UI 400, which dialog may be employed by the user to add a new category. In the example of FIG. 5, the new category is given the category name "People With A Birthday In March". FIG. 6 illustrates the Select Categories UI 400 wherein the new category has been added to the master list of categories and selected. Outside of the awareness of the user, a category ID may be generated for the new category and a category pattern determined, based on the category ID as will be described in detail hereinafter. Note that, for ease in locating a particular category in a lengthy master list of categories, categories may be listed alphabetically. Also note that a category name may contain spaces.

Figure 7:
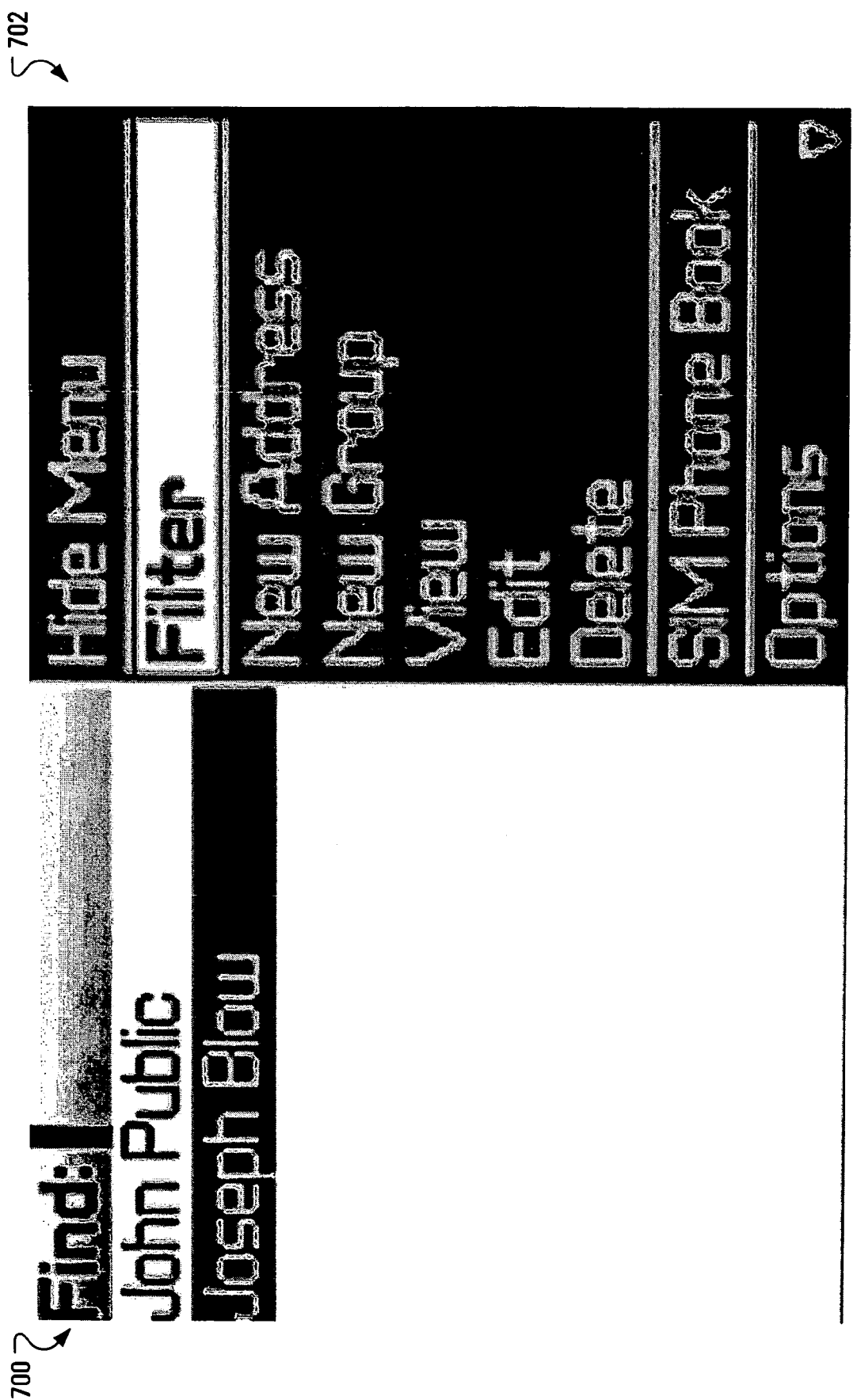
FIG. 7 illustrates activation of a filtering function associated with a listing of contacts maintained by the PIM application.

FIG. 7 illustrates a contact listing screen 700 exemplary of a contact listing screen that may be found in a PIM application executed on the handheld computer 102. While presented with the master list of categories in the contact listing screen 700, the user may trigger, e.g., by pressing a button on the handheld computer 102, the presentation of a menu. FIG. 7 illustrates the presentation of a menu 702 that includes several menu items. The menu items include: Hide Menu; Filter; New Address; New Group; View; Edit; Delete; SIM Phone Book and Options.

Figure 8:
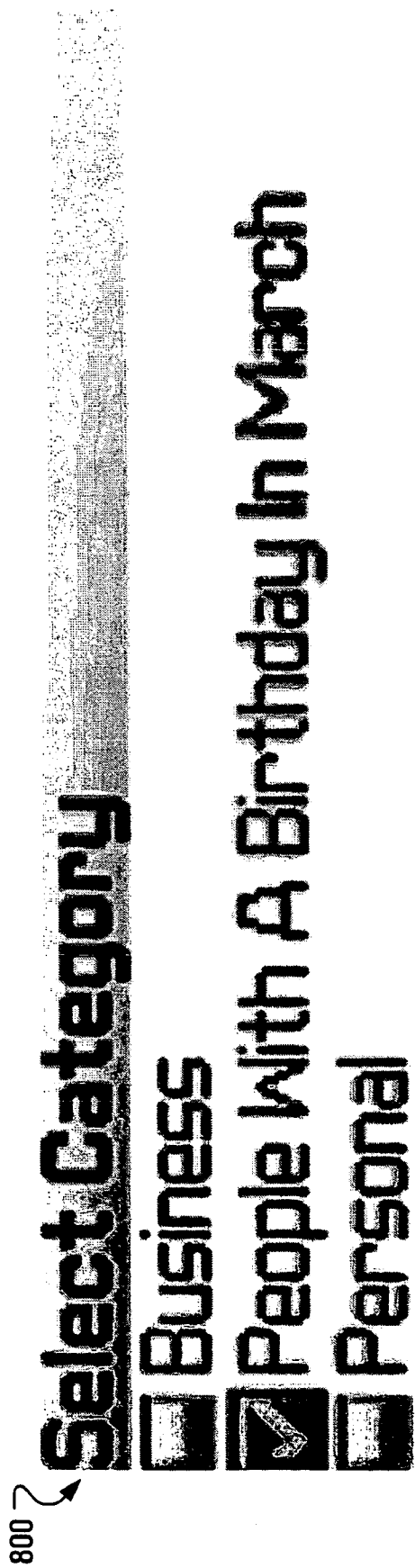
FIG. 8 illustrates the use of a "Select Category" UI associated with activating the filtering function in FIG. 7.

The selection of the Filter menu item may lead to the presentation of a Select Categories UI. FIG. 8 illustrates an exemplary Select Categories UI 800. By selecting one of the categories presented in the exemplary Select Categories UI 800, the user directs the handheld computer 102 to only present in the contact listing screen 700 a list of contacts that includes only the contacts associated with the selected category. That is, according to aspects of the present application, the handheld computer 102 presents, in the contact listing screen 700, a list of contacts, where each contact includes, among the patterns (of both the keyword type and the category type) associated with the contact, the category pattern for the selected category.

Figure 9:
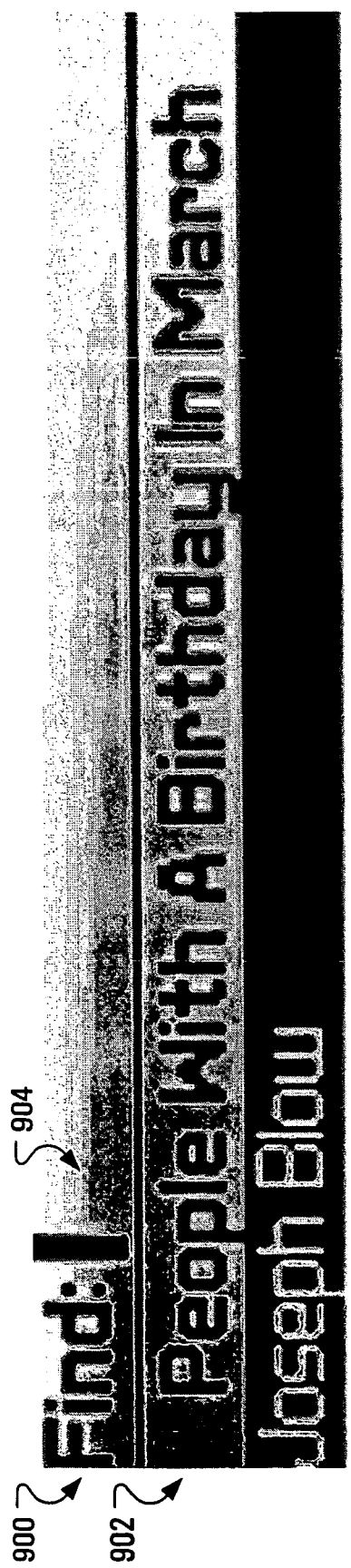
FIG. 9 illustrates the result of filtering the listing of contacts of FIG. 7 through the selection of a category in the "Select Category" UI of FIG. 8.

FIG. 9 illustrates a filtered contact listing screen 900 displaying a category-filtered list that is the result of filtering the list of contacts in the contact listing screen 700 of FIG. 7 through the selection of a category in the exemplary Select Category UI of FIG. 8. Notably, the category name of the category selected to generate the filtered contact listing screen 900 is displayed on a second line 902 of the filtered contact listing screen 900. Additionally, a data entry field 904 is presented on a first line of the filtered contact listing screen 900 to allow for the application of the keyword filtering scheme, as described hereinbefore, on the category-filtered list.

It is contemplated that the Select Category UI of FIG. 8 may allow for the selection of more than one category with which to filter a given list of data items. Consider the case of two selected categories, Category A and Category B. In one embodiment of this application, the category-filtered listing screen may be limited to those data items associated with Category A AND Category B (a Boolean "AND" operation). That is, each item in a list resulting from a Boolean "AND" operation is associated with all of the selected categories. While, in another embodiment of this application, the category-filtered listing screen may be limited to those data items associated with Category A OR Category B (a Boolean "OR" operation). That is, each item in a list resulting from a Boolean "OR" operation is associated with at least one of the selected categories. If the list of selected categories cannot be displayed entirely due to size constraints associated with the second line 902 of the filtered contact listing screen 900, the list of selected categories may be shown with ellipsis.

Figure 10:
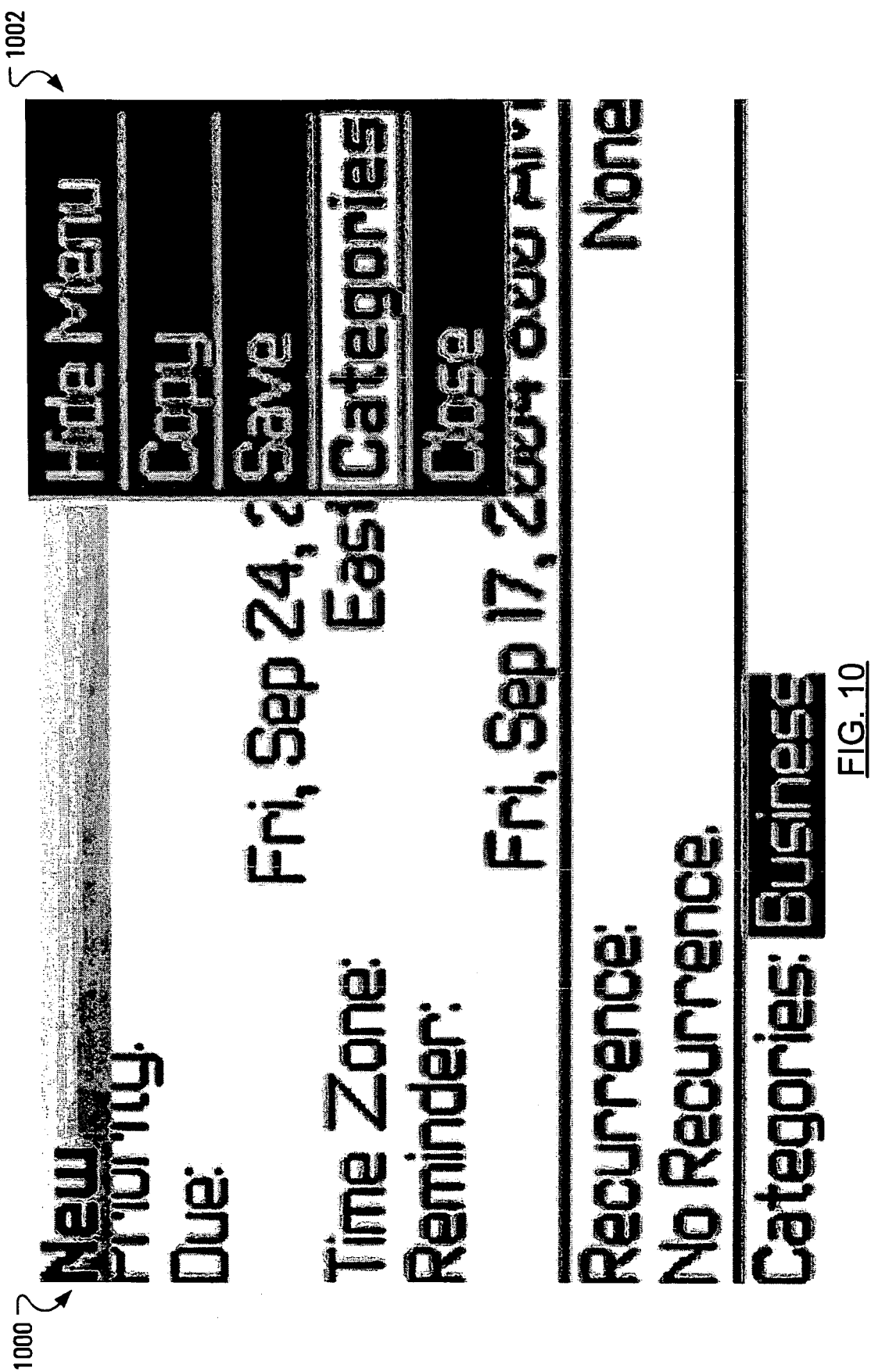
FIG. 10 illustrates the activation of the "Select Categories" UI from a task editing screen.

FIG. 10 illustrates an exemplary task editing screen 1000 exemplary of a task editing screen that may be found in a PIM application executed on the handheld computer 102. Many fields are available for populating for a data item (a task) being edited. While presented with the task editing screen 1000, the user may trigger, e.g., by pressing a button on the handheld computer 102, the presentation of a menu. FIG. 10 illustrates the presentation of a menu 1002 that includes several menu items. The menu items include: Hide Menu; Copy; Save; Categories; and Close. The selection of the Categories menu item may lead to the presentation of the Select Categories UI 400 as illustrated in FIG. 4, as described hereinbefore.

It is contemplated that a category maintenance application may be provided to allow a user to add categories to, or remove categories from, the master list of categories. Like the Select Categories UI 400, the category maintenance application may present a menu including menu items such as: Hide Menu; New; Delete; and Close.

Instead of requiring the user to select categories through the use of a Select Categories UI, a specialized edit field may be provided as part of a data item editing screen to facilitate direct entry of categories. A validation process may be performed on directly entered categories in the specialized edit field to ensure that any restrictions (e.g., length of category name, number of categories, etc.) are enforced. If a category entered in the specialized edit field does not exist in the master list of categories, the category may be automatically added to the master list of categories.

When viewing a data item, rather than editing a data item as discussed above, a Categories menu item may be available in an associated menu. Selecting the Categories menu item may display a read-only-version of the Select Categories UI, displaying all category names in the master list of categories, with checked checkboxes beside the category names of the categories with which the data item is associated.

In operation, the hereinbefore-described keyword filtering scheme may be employed to enable category-based filtering. As mentioned above, each category may be assigned an integer category ID. Additionally, for each category, a category pattern may be determined based on the category ID, such that the category pattern is unique to the category. Advantageously, the category patterns may be determined such that a search string entered by the user through the user interface (say, the data entry field 904, FIG. 9) may not match any of the category patterns.

Figure 11:
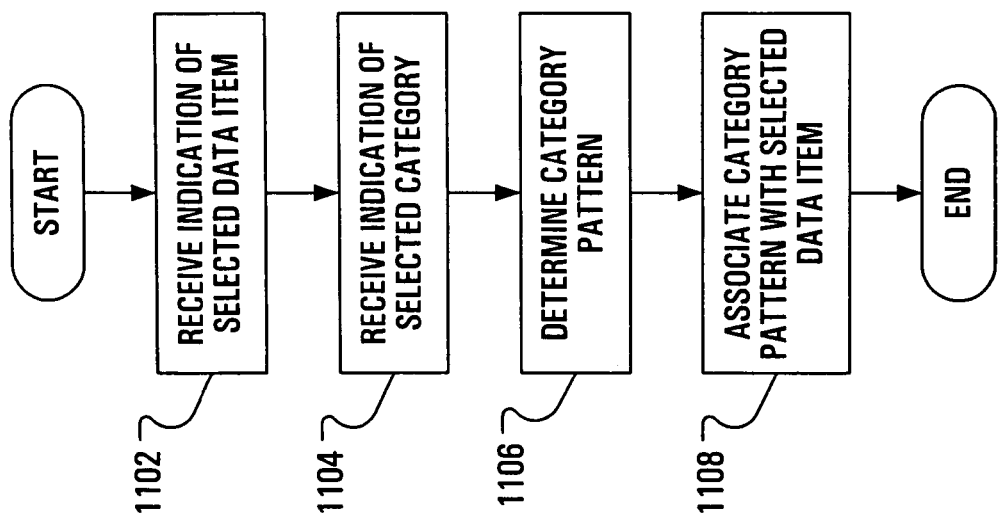
FIG. 11 illustrates steps in a category association method according to an embodiment of this application.

FIG. 11 illustrates steps in an exemplary method of associating a category with a data item. For example, a user may select a data item so that the handheld computer 102 receives an indication of the selected data item (step 1102). The handheld computer 102 may react to the selection of the data item by displaying a data item editing screen, such as the contact editing screen 300 illustrated in FIG. 3. The user may then invoke the Select Categories UI 400 (see FIG. 4). Using the Select Categories UI 400, the user may select a category so that the handheld computer 102 receives an indication of the selected category (step 1104). The handheld computer 102 may then determine the category pattern previously formulated for, and associated with, the selected category (step 1106). It should be expected that the category pattern is formulated in conjunction with the assignment of a category ID to the selected category, as will be discussed hereinafter. However, if a category pattern has not yet been formulated for the selected category, a category pattern may be formulated responsive to the selection of the category for association with the selected data item. Once the category pattern has been determined for the selected category, the category pattern may be added (step 1108) to the patterns (both of the keyword type and the category type) that have been previously associated with the selected data item.

Where the category pattern for the selected category has been formulated to have a structure similar to the keyword patterns, i.e. to satisfy a rule specifying five-bit elements, then when the user chooses to filter a given list of data items using a selected category, the category pattern for the selected category may be used in the keyword filtering scheme to restrict the given list and produce a category-filtered list. The resulting category-filtered list then includes only those data items in the given list that are associated with the selected category. That is, the category-filtered list includes only those data items in the given list that include the category pattern associated with the selected category.

Although the category pattern determined for a category may appear to be no different from any other pattern in the keyword filtering scheme, advantageously, a pattern determined for a category may be determined such that the user can not enter a search string that maps to the pattern.

A category pattern may be formulated as follows. The first character of the pattern may be a special character (e.g., 0)

that does not map to a character that the user may enter. As such, the possibility that the user may be presented with data items, in a keyword-filtered list (rather a category-filtered list), that are associated with a category whose category pattern matches the elements of the search criteria may be obviated. For instance, it may be that a category named "Real Estate Agents" has been assigned a decimal category ID of 998. A category pattern generated based on this category ID may be (0, 14, 6, 3).

If the first character of the category pattern was not a special character, then the category pattern would be (14, 6, 3). If, in such a case, the user entered "n" (which, according to the exemplary mapping scheme proposed above, maps to 14) to begin filtering address book data items to find a friend named Nick, then the keyword-filtered list would incorrectly include address book data items associated with the category named "Real Estate Agents".

After assigning the special character to the first element in a category pattern, each of the remaining elements may be determined by using the category ID.

The second element may be of the form XXYYY, where the initial two bits (XX) indicate a number of additional elements, beyond an initial number of elements, that are required to represent the category ID. For instance, according to one embodiment of this application, the initial number of elements is three and the number of additional elements may be in the range from zero to three, such that a category pattern may comprise three, four, five or six elements. A category pattern comprising six elements, where each element is a five-bit value, allows for over eight million distinct category IDs, which is considered, by the Applicant, to be sufficient. The final three bits (YYY) of the second element may be used to indicate the three most significant bits (bits 7, 6 and 5) of the lowest order byte of a binary representation of the category ID.

The third element may of the form ZZZZZ, where the five bits may be used to indicate the five least significant bits (bits 4, 3, 2, 1, 0) of the lowest order byte of the binary representation of the category ID.

The fourth element, if necessary, may be of the form RRRRR, where the five bits may be used to indicate the five least significant bits (bits 4, 3, 2, 1, 0) of the second lowest order byte of the binary representation of the category ID.

The fifth element, if necessary, may be of the form VVVEE, where the initial three bits (VVV) may be used to indicate the three most significant bits (bits 7, 6, 5) of the second lowest order byte of the category ID. The final two bits (EE) may be used to indicate the two least significant bits (bits 1, 0) of the third lowest order byte of the binary representation of the category ID, i.e., the highest order byte of a category ID represented by three bytes.

The sixth element, if necessary, may be of the form SSSSS, where the five bits may be used to indicate five of the six most significant bits (bits 6, 5, 4, 3, 2) of the third lowest order byte of the binary representation of the category ID, i.e., the highest order byte of a category ID represented by three bytes. It may be assumed that the most significant bit (bits 7) of the third lowest order byte of the binary representation of the category ID is zero.

This approach may be shown to allow for fast lookups for the first 255 categories (since the category patterns for these categories are three five-bit values) and to support up to $2^{23}-1$ (over 8 million) category IDs. Lookups beyond the first 255 categories are not expected to be substantially slower.

Although the keyword patterns may be restricted to three elements, aspects of the present application allow for category patterns having more than three elements without losing the ability to use the keyword filtering scheme. Notably, the keyword filtering scheme is arranged to include a data item associated with a three-element keyword pattern in a keyword-filtered list based on a target pattern with two elements, so long as the first two elements of the three-element keyword pattern match the target pattern. However, the above-described practice of including, in the first two bits of the second element, an indication of a number of additional elements beyond an initial number of elements guarantees that a data item associated only with a category pattern with more than the initial number of elements will not be included in a category-filtered list based on a target pattern with only the initial number of elements. That is, the filtering scheme will not include a data item associated only with a four-element category pattern in a category-filtered list based on a target pattern with three elements.

Multiple categories are known to be available to be associated with data items in the Calendar application of Microsoft Outlook, which acts as a client for Microsoft Exchange Server. Clearly, the allowance of association of multiple categories with address book, task or memo data items may be extended to also include calendar data items.

Notably, the PIM application executed at the handheld computer 102 may be integrated into the core operating system of the handheld computer 102. In so doing, from a user interface perspective, the association of the multiple categories with a single data item and subsequent category-based filtering may be considered to be seamless and easy to use.

As will be understood by the person of ordinary skill in the art, where the elements that comprise the category pattern have been described herein as satisfying a rule specifying that the elements be five-bit values, the number of bits to include in the category pattern elements may be considered a design decision. Additionally, dependent upon the operation of the keyword filtering scheme, the five-bit element rule may be replaced by one or more other rules that are to be satisfied by the category patterns in order that the keyword filtering scheme may be employed for category-based filtering. Furthermore, although the association of category patterns with data items has been described in conjunction with a description of the operation of a PIM application on a handheld computer, it may considered that such an association may improve efficiency of searches in PIM applications executed on personal computers.

Other modifications will be apparent to those skilled in the art and, therefore, the invention is defined in the claims.

We claim:

1. A method in a computing device for facilitating searching and retrieval of a personal information manager data item associated with a personal information manager application, said method comprising:
consequent upon associating a given personal information manager data item with said personal information manager application,
deriving a keyword pattern from a given keyword of said given data item in accordance with a first mapping function;
associating said keyword pattern with said given data item, said keyword pattern being an ordered plurality of elements;
receiving a selection for a category for said given data item and associating a category pattern with said given data item, said category pattern being a second ordered plurality of elements, said category pattern derived in accordance with a second mapping function different from said first mapping function such that no keyword search string maps to said category pattern;

consequent upon receiving a user search request comprising an entered keyword search string or an indication of a category to be searched:

generating a target pattern from said keyword search string or from said indication of said category to be searched;

searching personal information manager data items associated with said personal information manager application to identify personal information manager data items matching said target pattern, said searching comprising:

for each particular personal information manager data item encountered, comparing said target pattern with each category pattern and each keyword pattern associated with said particular personal information manager data item so that a single search on any given target pattern covers category patterns and keyword patterns associated with personal information manager data items;

returning each personal information manager data item having an associated category pattern or associated keyword pattern which matches said target pattern.

2. The method of claim 1 wherein one element of said plurality of elements of said category pattern has a value indicative that said category pattern is representative of a category.

3. The method of claim 2 wherein said one element is a first element of said plurality.

4. The method of claim 3 wherein said keyword of said given data item is entered by a user and said first element has a predetermined number of bits such that said first element may be determined to have one of a limited set of values, where said limited set of values is divided into a first set of values to which characters available for entry by said user may be mapped and a second set of values to which characters available for entry by said user may not be mapped, said method further comprising selecting said value indicative that said category pattern is representative of a category from among values in said second set of values.

5. The method of claim 1 wherein said receiving a user search request comprises receiving an indication of a category to be searched as a selection from a master list of categories and further comprising adding a category to said master list of categories by:

receiving a new category name;
associating a plurality of elements with said new category name, said plurality of elements being derived in accordance with said second mapping function; and
adding a reference to said new category name to said master list of categories.

6. The method of claim 5 wherein said plurality of elements associated with said new category name comprises, in a given element, a value indicating a quantity of elements in said plurality of elements associated with said new category name.

7. The method of claim 1 wherein said category pattern is a first category pattern and further comprising associating a second category pattern with said given data item such that a search on any given pattern covers said first category pattern, said second category pattern and said keyword pattern associated with said given data item.

8. The method of claim 1 wherein said computing device is a personal information manager application executed on a handheld computer and wherein said receiving a selection for a category for said given data item at said handheld computer comprises:

receiving a category name associated, in a personal information manager application executed on a personal computer, with a first data item;
assigning a category reference integer to said received category name;
formulating, based on said category reference integer, a plurality of elements; and wherein said associating a category pattern representative of said category with said given data item comprises associating, in said personal information manager application executed on said handheld computer, said plurality of elements with said given data item.

9. The method of claim 8, wherein said category is a first category, said category reference integer is a first category reference integer and said plurality of elements is a first ordered plurality of elements, said method further comprising:

receiving, at said handheld computer, an indication of a second category associated, in said personal information manager application executed on said personal computer, with said first data item;
assigning a second category reference integer to said second category;
formulating based on said second category reference integer, a second plurality of elements; and
associating, in said personal information manager application executed on said handheld computer, said second ordered plurality of elements with said second data item.

10. The method of claim 1 further comprising deriving a category pattern for each category in a pre-defined master list of categories in accordance with said second mapping function.

11. A handheld computer for facilitating search and retrieval of a personal information manager data item associated with a personal information manager application executing on said handheld computer, said handheld computer adapted to:

consequent upon associating a given personal information manager data item with said personal information manager application:

derive a keyword pattern from a given keyword of said given data item in accordance with a first mapping function;
associate said keyword pattern with said given data item, said keyword pattern being an ordered plurality of elements;
receive a selection for a category for said given data item and associate a category pattern with said given data item, said category pattern being a second ordered plurality of elements, said category pattern derived in accordance with a second mapping function different from said first mapping function such that no keyword search string maps to said category pattern;

consequent upon receiving a user search request comprising an entered keyword search string or an indication of a category to be searched:

generate a target pattern from said user search request;
search personal information manager data items associated with said personal information manager application to identify personal information manager data items matching said target pattern, said search comprising:

for each particular personal information manager data item encountered, comparing said target pattern with each category pattern and each keyword pattern associated with said particular personal information manager data item so that a single search on any given target pattern covers category patterns and keyword patterns associated with personal information manager data items;

returning each personal information manager data item having an associated category pattern or associated keyword pattern which matches said target pattern.

12. The handheld computer of claim 11 wherein said handheld computer is further adapted to derive a category pattern for each category in a pre-defined master list of categories in accordance with said second mapping function.

13. The handheld computer of claim 11 wherein said receive a selection for a category comprises receiving a selection from a master list of categories and wherein said handheld computer is further adapted to:
   add a category to said master list of categories;
   receive a new category name;
   associate a plurality of elements with said new category name, said plurality of elements being derived in accordance with said second mapping function; and
   add a reference to said new category name to said master list of categories.

14. A computer readable storage medium containing computer-executable instructions to facilitate search and retrieval of a personal information manager data item associated with a personal information manager application executing on a handheld computer, said computer-executable instructions, when performed by processor in said handheld computer, causing said processor to:
   consequent upon associating a given personal information manager data item with said personal information manager application:
      derive a keyword pattern from a given keyword of said given data item in accordance with a first mapping function;
      associate said keyword pattern with said given data item, said keyword pattern being an ordered plurality of elements;
      receive a selection for a category for said given data item and associate a category pattern with said given data item, said category pattern being a second ordered plurality of elements, said category pattern derived in accordance with a second mapping function different from said first mapping function such that no keyword search string maps to said category pattern;
   consequent upon receiving a user search request comprising an entered keyword search string or an indication of a category to be searched:
      generate a target pattern from said user search request;
      search personal information manager data items associated with said personal information manager application to identify personal information manager data items matching said target pattern, said search comprising:
         for each particular personal information manager data item encountered, comparing said target pattern with each category pattern and each keyword pattern associated with said particular personal information manager data item so that a single search on any given target pattern covers category patterns and keyword patterns associated with personal information manager data items;
      returning each personal information manager data item having an associated category pattern or associated keyword pattern which matches said target pattern.

15. The computer readable storage medium of claim 14 wherein said receive a selection for a category comprises receiving a selection from a master list of categories and wherein said computer readable medium further contains computer-executable instructions that, when performed by processor in a handheld computer, cause said processor to:
   add a category to said master list of categories;
   receive a new category name;
   associate a plurality of elements with said new category name, said plurality of elements being derived in accordance with said second mapping function; and
   add a reference to said new category name to said master list of categories.

16. The computer readable storage medium of claim 14 wherein said computer readable medium further includes computer-executable instructions to derive a category pattern for each category in a pre-defined master list of categories in accordance with said second mapping function.

* * * * *